(12) United States Patent
Connell, II et al.

(10) Patent No.: US 9,911,411 B2
(45) Date of Patent: *Mar. 6, 2018

(54) RAPID SPEECH RECOGNITION ADAPTATION USING ACOUSTIC INPUT

(71) Applicant: International Business Machines Corporation, Armonk, NY (US)

(72) Inventors: Jonathan H. Connell, II, Cortlandt-Manor, NY (US); Etienne Marcheret, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/755,596

(22) Filed: Jun. 30, 2015

(65) Prior Publication Data

US 2016/0358601 A1    Dec. 8, 2016

Related U.S. Application Data

(63) Continuation of application No. 14/728,528, filed on Jun. 2, 2015.

(51) Int. Cl.
| | | |
|---|---|---|
| *G10L 15/07* | (2013.01) | |
| *G10L 15/10* | (2006.01) | |
| *G10L 15/26* | (2006.01) | |
| *G10L 17/02* | (2013.01) | |
| *G10L 17/00* | (2013.01) | |
| *G10L 15/02* | (2006.01) | |

(52) U.S. Cl.
CPC ............ *G10L 15/075* (2013.01); *G10L 15/10* (2013.01); *G10L 15/265* (2013.01); *G10L 17/02* (2013.01); *G10L 17/00* (2013.01); *G10L 2015/025* (2013.01)

(58) Field of Classification Search
CPC ....... G10L 15/20; G10L 15/075; G10L 15/22; G10L 15/26; G10L 2015/223
USPC .......................................................... 704/224
See application file for complete search history.

(56) References Cited

U.S. PATENT DOCUMENTS

| | | | |
|---|---|---|---|
| 7,143,042 B1 * | 11/2006 | Sinai | ..................... G10L 15/22 704/270.1 |
| 7,684,988 B2 | 3/2010 | Barquilla | |
| 8,244,536 B2 | 8/2012 | Arun | |

(Continued)

FOREIGN PATENT DOCUMENTS

WO          9313517 A1     7/1993

OTHER PUBLICATIONS

List of IBM Patents or Patent Applications Treated as Related.

*Primary Examiner* — Houshang Safaipour
*Assistant Examiner* — Bharatkumar S Shah
(74) *Attorney, Agent, or Firm* — Yeen Tham; Ryan, Mason & Lewis, LLP (57) ABSTRACT

A method includes the following steps. An acoustic input is obtained from a user, including issuing a verbal prompt to the user and receiving the acoustic input from the user in response to the verbal prompt. One or more acoustic representations are obtained, wherein the one or more acoustic representations are generated from a list of expected responses to the issued verbal prompt. The acoustic input from the user is compared to the one or more acoustic representations. One or more speech recognition parameters are adjusted based on the comparison.

10 Claims, 4 Drawing Sheets

(56) References Cited

U.S. PATENT DOCUMENTS

| | | | |
|---|---|---|---|
| 2003/0083874 A1* | 5/2003 | Crane | G10L 15/22 |
| | | | 704/246 |
| 2004/0260554 A1* | 12/2004 | Connell | G10L 15/25 |
| | | | 704/270 |
| 2005/0096906 A1* | 5/2005 | Barzilay | G06Q 30/06 |
| | | | 704/249 |
| 2011/0257976 A1 | 10/2011 | Huo | |
| 2013/0120769 A1* | 5/2013 | Kakutani | G06K 15/10 |
| | | | 358/1.8 |
| 2014/0372122 A1* | 12/2014 | Harsham | G10L 15/22 |
| | | | 704/257 |
| 2015/0206538 A1* | 7/2015 | Aviles-Casco | G10L 17/00 |
| | | | 704/246 |
| 2015/0348533 A1* | 12/2015 | Saddler | G10L 13/027 |
| | | | 704/260 |

* cited by examiner

RAPID SPEECH RECOGNITION ADAPTATION USING ACOUSTIC INPUT

CROSS-REFERENCE TO RELATED APPLICATION

This application is a Continuation of U.S. patent application Ser. No. 14/728,528, filed on Jun. 2, 2015, the disclosure of which is incorporated herein by reference in its entirety.

FIELD

The field relates generally to speech recognition and, more particularly, to techniques for adjusting a speech recognition system based on acoustic input.

BACKGROUND

Speech recognition is the translation of spoken words to text and, more particularly, it is the computer-driven transcription of spoken language into readable text in real-time. Speech recognition technology was initially developed to aid individuals in tasks where their hands were busy. It can also aid people with disabilities. For example, speech recognition systems could be helpful for people who are deaf or cannot operate a standard keyboard, such as those affected by cerebral palsy or even arthritis.

Speech recognition systems are rapidly increasing in significance in many areas of data and communications technology. In recent years, speech recognition has advanced to the point where it is used by millions of people across various applications. Speech recognition applications now include interactive voice response systems, voice dialing, data entry, dictation mode systems including medical transcription, automotive applications, etc. There are also "command and control" applications that utilize speech recognition for controlling tasks such as adjusting the climate control in a vehicle or requesting a smart phone to play a particular song.

The performance of a speech recognition system is usually evaluated in terms of accuracy and speed. Therefore, regardless of the application, a goal of any speech recognition system is to accurately and efficiently convert speech into actionable commands or readable text.

SUMMARY

Embodiments of the invention provide techniques for adjusting and/or adapting a speech recognition system using acoustic input.

For example, in one embodiment of the invention, a method comprises the following steps. An acoustic input is obtained from a user, including issuing a verbal prompt to the user and receiving the acoustic input from the user in response to the verbal prompt. One or more acoustic representations are obtained, wherein the one or more acoustic representations are generated from a list of expected responses to the issued verbal prompt. The acoustic input from the user is compared to the one or more acoustic representations. One or more speech recognition parameters are adjusted based on the comparison.

DETAILED DESCRIPTION

Illustrative embodiments of the invention may be described herein in the context of illustrative methods, systems and devices for speech recognition using acoustic input. However, it is to be understood that embodiments of the invention are not limited to the illustrative methods, systems and devices but instead are more broadly applicable to other suitable methods, systems and devices.

As used herein, acoustic input refers to information that is detected and captured in an audio-only modality or a modality capable of capturing audio and visual information. For example, devices which detect and capture sound such as, but not limited to, a microphone, or any suitable device comprising an audio sensor component.

For speech recognition to work accurately it is important to compensate for the acoustic channel properties and for the characteristics of a speaker's voice. The earlier in an interaction that this can be accomplished, the more beneficial it is for the speech recognition system.

Conventional speech recognition adaptation processes do not provide adequate solutions and tend to suffer from the same problems—misinterpretation and taking a long time to adapt. For example, direct Mel Frequency Cepstral Coefficient (MFCC) mapping is usually run with a slow update rate since the system has only limited confidence in its interpretation of each of the user's utterances because the acoustic model is likely to be off at the start. The system might take a long time to adapt, and thus may misinterpret the first few utterances. As another example, constrained (feature space) maximum likelihood linear regression (MLLR) or vocal tract length normalization (VTLN) systems need to have a reasonably low decoded error rate to form a hypothesis used in generating the forced alignment adaptation statistics. This is inherently difficult to do because of the high likelihood that the acoustic model will be mismatched to the current speaker and/or environment. As with MFCC mapping, these systems can also take a long time to adapt and thus may misinterpret the first few utterances.

Various embodiments described herein provide techniques to rapidly adapt and/or adjust a speech recognition system by exploiting the normal greeting pattern of humans to tune speech recognition at the start of a conversation. Rather than simply idle chit-chat, this technique can be used like old acoustic telephone modems, which would negotiate baud rates upon connection.

Figure 1:
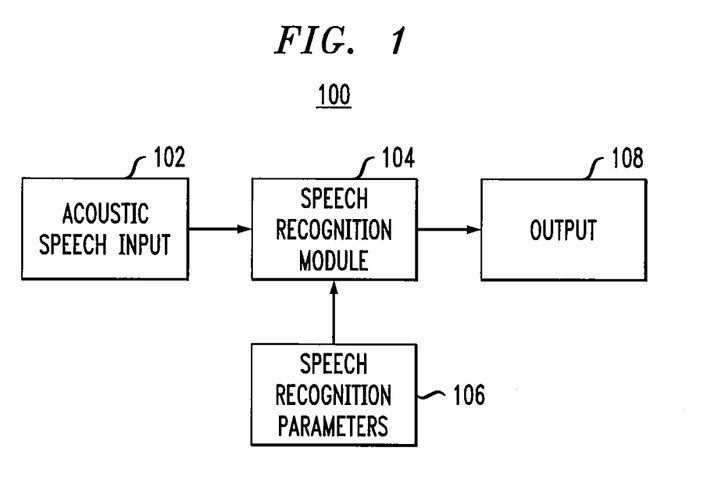
FIG. 1 depicts an overview of a speech recognition system according to an embodiment of the invention.

FIG. 1 shows a speech recognition system according to an embodiment of the invention. Speech recognition system 100 receives an acoustic input 102 for processing by a speech recognition module 104. Acoustic input might be obtained by means of an acoustic component, such as a microphone. The speech recognition module 104 also receives as input speech recognition parameters 106. Details of the speech recognition parameters 106 will be further described in the context of FIGS. 2 and 3 below. Advantageously, receiving the speech recognition parameters 106 at the start of a conversation allows the speech recognition system 100 to tune speech recognition early on during a conversation. The results from the speech recognition module 104 are then either interpreted as commands or transcribed as text for output on a device at step 108. A device may be a tablet, a smartphone, a laptop or any other suitable electronic or computing device. Alternative embodiments of the speech recognition system 100 may comprise more or less functionally equivalent modules. All modules can be integrated within a single system or within multiple systems which may be remotely located. It is to be understood that speech adaptation module 104 may be implemented using hardware, software or a combination of hardware and software running on one or more computing or other processing devices.

Figure 2:
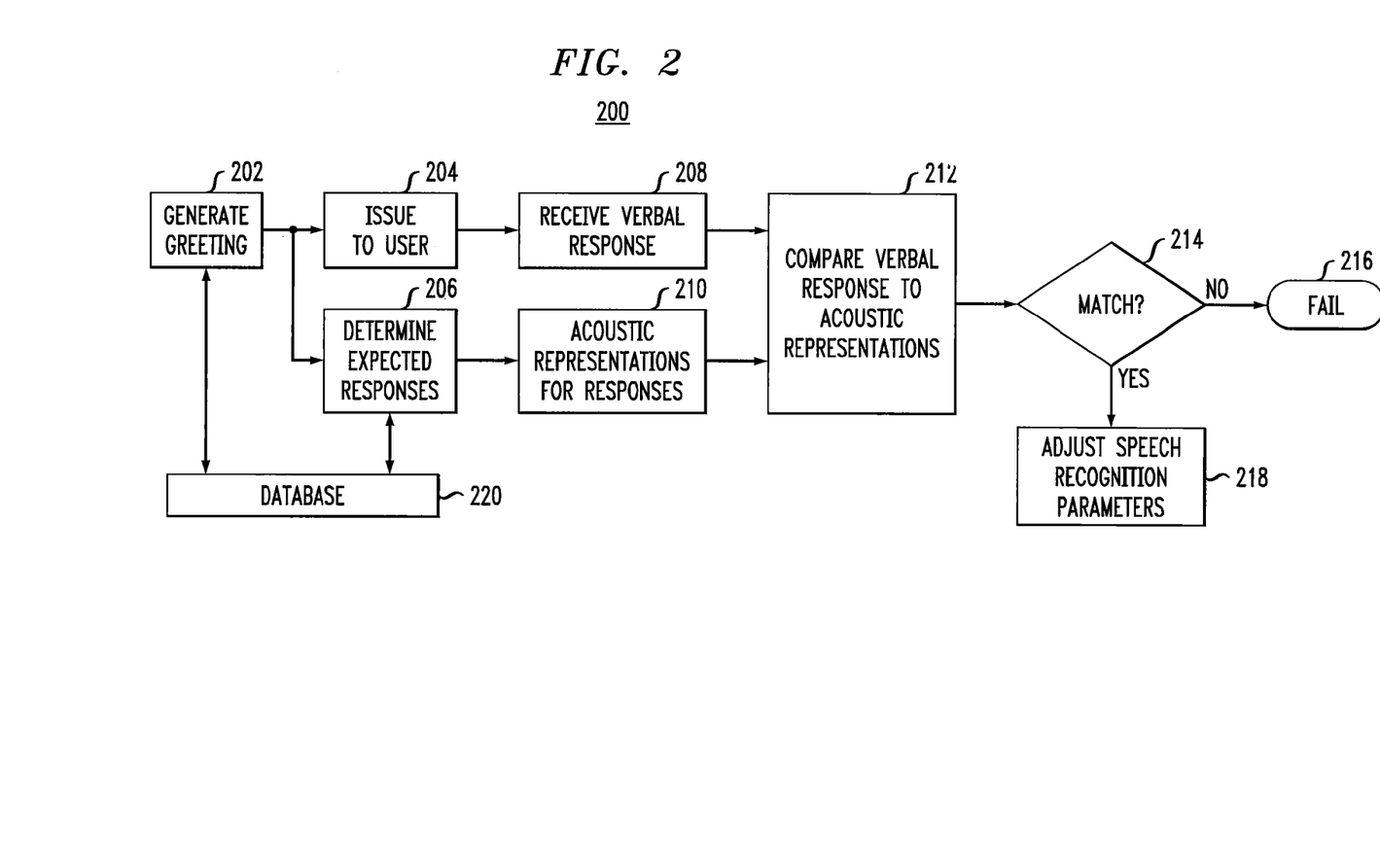
FIG. 2 depicts an illustrative embodiment of a speech adaptation module used in the speech recognition system of FIG. 1.

FIG. 2 shows an illustrative embodiment of a speech adaptation module 200 that generates and/or alters the values for speech recognition parameters 106 of FIG. 1. Speech adaptation module 200 starts at step 202 in which a greeting is generated and presented to a user. The greeting can be one selected from a list of greetings previously stored in a database 220. The greeting is issued to the user at step 204. For example, the greeting can be issued to a user as a prompt with a phrase like "Hi, how are you?" for which there are a limited number of expected responses, such as "Fine. How are you?" The speech adaptation module 200 then proceeds to step 206 to determine expected responses to the issued greeting. For example, expected responses to the prompt "Hi, how are you?" may be "Fine. Thank you." or "Okay. How are you?" etc. The user's verbal response to the issued greeting is received at step 208. From the received verbal response, a sequence of voice frequency estimates in a suitable format (e.g., mel-cepstral coefficients) may be generated. The speech adaptation module 200 then generates the acoustic representations for the expected responses at step 210. For example, the expected responses may be stored as a list in text format in database 220. From the text, it is possible to generate a sequence of phonemes, and from these a sequence of voice frequency estimates in the same format (e.g., mel-cepstral coefficients) may be obtained as would be obtained from processing the acoustic input from the user. Subsequently, it is the intermediate representations (i.e., the sequences of voice frequency estimates) that are compared. Advantageously, having a limited number of expected responses allows even a mistuned speech recognition to align the text result with the acoustic fragments. Moreover, since the semantic content of such responses is usually unimportant, the responses can be aggressively mined for tuning information to be stored in database 220 or in a separate database so that subsequent, less constrained utterances are properly recognized. At step 212, the acoustic representations of the received verbal response from the user are compared against the acoustic representations of the expected responses. The response comparison module is further delineated below in the context of FIG. 3. At step 214, a determination is made as to whether or not there is a match between the acoustic representations of the received verbal response and the acoustic representations for the expected responses. If there is no match, the result is a "FAIL" at step 216. Optionally, the speech adaptation module 200 may repeat steps 202 to 214 until a match is made. If at step 214, it is determined that there is a match between the acoustic representations of the received verbal response and the acoustic representations for the expected responses, the speech adaptation module 200 proceeds to step 218, in which one or more speech recognition parameters are adjusted based on the match. Exemplary speech recognition parameters include an expected duration of particular sounds (e.g., how long a drawled "a" might be), the squelch floor (e.g., if the background is noisy, ignore sounds quieter than X), and the reverberation characteristics of the environment (e.g., to help suppress echoes in small rooms). The adjusted speech recognition parameters 218 may be the speech recognition parameters 106 received by speech recognition module 104 in FIG. 1.

Adjustment of the speech recognition module 104 may include detecting a class of speaker based on the comparison results. The class of speaker may be selected from an age group, an ethnicity, a gender, etc. Then based on the detected class of speaker, an acoustic model is selected. For example, adjustment may be performed via application of feature space mapping, i.e., a feature transformation stored as a matrix and applied on the input feature space (estimated to maximize the likelihood of the acoustic model for the expected text and input features). Illustratively, a frequency representation of a short segment of speech, e.g., a spectrogram represented as a vector of numbers, may be transformed into a slightly different spectrogram by the matrix. This may be applied to various techniques, such as, for example, VTLN for higher pitched speakers (e.g., children) and spectral compensation for the channel (e.g., boost the signals at 4 KHz by a factor of 1.2×). Adjusting the speech recognition module 104 may also involve a more aggressive than usual application of feature space mapping. Typically, small adjustments are made over a long period of time to prevent mistakenly estimating the change needed. For example, a higher pitch in someone's voice might indicate momentary excitement or distress. As such, it would not be necessary to act to normalize this right away as it is likely to be a passing condition. By contrast, if a high pitched voice is heard during the greeting, it is more likely that the user is a child. Hence, a more aggressive than usual application of feature space mapping may be used immediately to make the necessary corrections and adjustments to the speech recognition parameters.

Figure 3:
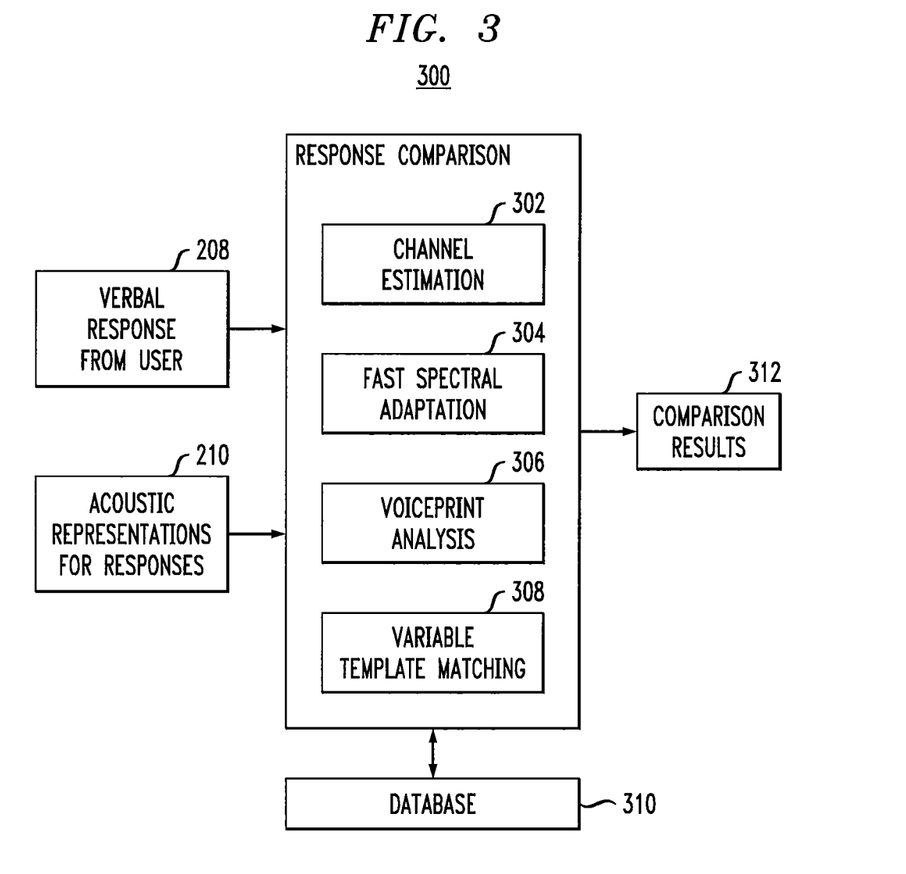
FIG. 3 depicts an illustrative embodiment of a response comparison module used in the speech adaptation module of FIG. 2.

FIG. 3 shows an illustrative embodiment of the response comparison module 300 used in step 212 of FIG. 2 above. Response comparison module 300 receives as input the verbal response from the user (e.g., step 208 of FIG. 2) and the acoustic representations for the responses (e.g., step 210 of FIG. 2). Response comparison module 300 comprises a channel estimation module 302, a fast spectral adaptation module 304, a voice print analysis module 306 and a variable template matching module 308. The response comparison module 300 also interacts with a database 310, which may be the same as or different from database 220. The response comparison module 300 may obtain a variety of information from database 310. For example, voice ID patterns for voice print analysis module 306, expected responses for variable template matching module 308, and acoustic signatures for classes of speakers (e.g., the elderly) for fast spectral adaptation module 304.

To perform a response comparison, channel estimation module 302 can perform various channel estimation methods with the short "chit-chat" sample of speech received from the user in response to the issued greeting. Channel estimation module 302 analyzes how much energy is actually in each audio frequency band versus how much energy is expected, which entails examining the actual acoustic representation of the user's response. For example, one method is to use grammar-based end-pointing to identify the leading and trailing silences, which then helps to determine the signal-to-noise ratio. Another example involves examining the phonemes in the utterance to estimate the frequency response of the channel. For instance, the "F" in "Fine" would be expected to generate a high frequency noise burst typical of a fricative. If this expected frequency is missing it might make sense to switch to a telephony acoustic model since telephones typically cut off around 3.3 KHz. Similarly, vowels are usually voiced so that the "o" in "How" can be used to check for the voice fundamental, usually around 100-200 Hz. For channels such as telephony there is also a low frequency cutoff around 300 Hz, so the absence of the voicing frequency helps further characterize the channel. As still another example, an autocorrelation spectrum can be computed to estimate channel echo characteristics, especially since the ground truth of the verbal response can be assumed known with high confidence. The "ground truth" here refers to the acoustic signal that would be generated by someone speaking the expected reply. That is, for each time point in the received audio signal, the system knows how much energy should be present at each different frequency. For example, echoes typically inject extra energy that should not be there due to an acoustic delay from earlier parts of the utterance.

In addition, fast spectral adaptation 304 is a fine tuning tool, it can be performed with an aggressive update rate since the ground truth for the recognition results is almost surely correct. It is also possible to make wholesale swaps of one complete acoustic model for another, especially when the identity of the speaker is known. The voice model for the speaker (i.e., user) can be adapted at either a coarse or fine level. Since the "o" in "How" is known to be voiced, the frequency of the fundamental (or its harmonics) can be used to switch between male, female, or child models (e.g., using rough Vocal Tract Length Normalization). Other voice characteristics, such as vowel shifts ("Faiyne" instead of "Fine") can be used to switch between regional dialectic acoustic (or language) models, such as Southern Drawl or Indian English. Furthermore, using voiceprint analysis module 306 on the received verbal response from the user, even if the response is a mere 2-3 seconds of speech, it may be possible to identify exactly which of a small number of enrolled speakers is present. It should be noted that prior to using the speech recognition system described herein, users may be enrolled/registered, one or more sample audio segments may be obtained from the users and stored for subsequent use, e.g., voiceprint analysis. Once identified, the speaker-specific acoustic model can be used for all following utterances.

Variable template matching module 308 may be used as another mode of operation that involves not fixed, but patterned, responses. In response to prompt such as: "Hi. Who do we have on the line and where are you from?" the answer is likely to be: "Hi. I'm X from Y." The speech recognition system might have no idea what X and Y are, but the rest of the pattern is very standardized and could be used as described above to perform channel estimation, fast spectral adaptation or voiceprint analysis with the response. In fact, the system need not even attempt to recognize the strings associated with variable portions (X and Y) of the pattern. However, if it did attempt recognition, either before or after basic adaptation using the fixed parts of the pattern, the actual values could also be helpful. For example, if X was "Jim" and he is a known enrolled speaker, the system could rapidly switch to his speaker-specific model. Or, if Y was "Atlanta" the system could further configure itself with the Southern Drawl acoustic model and perhaps region-specific language model alterations (e.g., "y'all" instead of "you", "pop" versus "soda"). The results of the response comparison module 300, comparison results 312, are then sent as output to determine if there is a match at step 214 of FIG. 2.

It should be noted that in using any of modules 302-308, response comparison module 300 may interact with database 310 to retrieve stored data and/or add onto the stored data in the database 310. Furthermore, comparison module 300 may use one or more of the modules 302-308 in performing the comparison. Furthermore, all modules can be integrated within a single system or within multiple systems which may be remotely located. It is to be understood that response comparison module 300 and modules 302-308 may be implemented using hardware, software or a combination of hardware and software running on one or more computing or other processing devices.

Embodiments of the present invention may be a system, a method, and/or a computer program product. The computer program product may include a computer readable storage medium (or media) having computer readable program instructions thereon for causing a processor to carry out aspects of the present invention.

Figure 4:
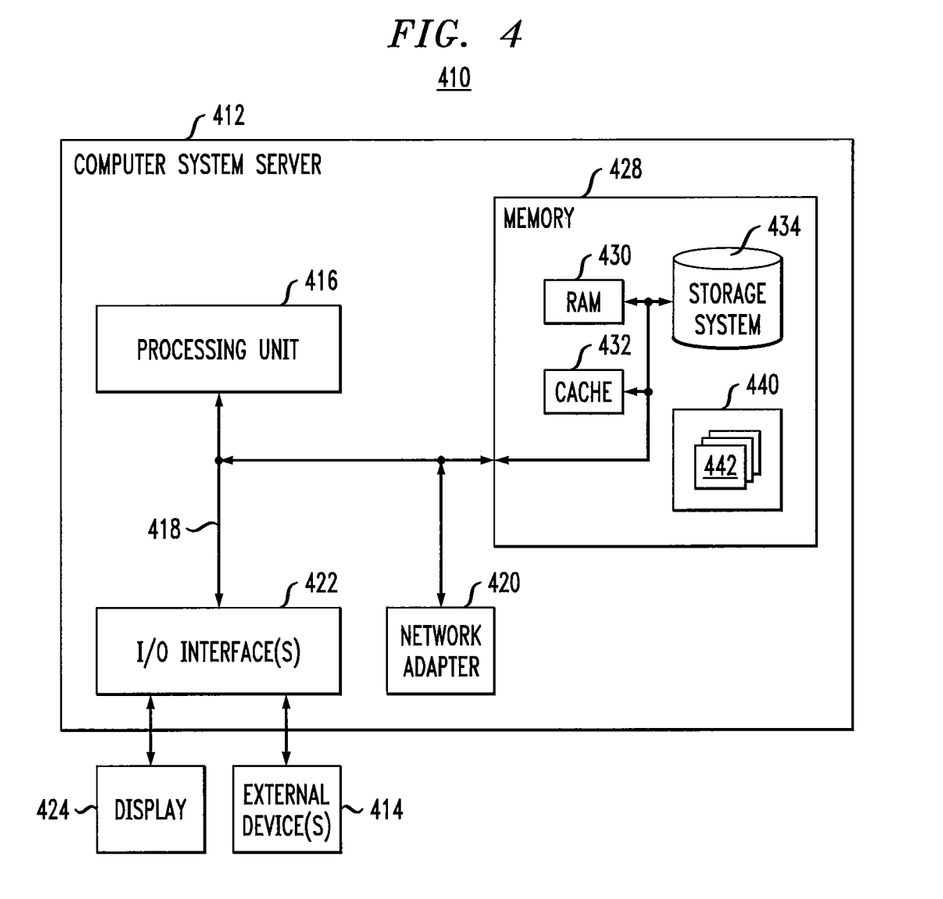
FIG. 4 depicts a computer system in accordance with which one or more components/steps of techniques of the invention may be implemented according to an embodiment of the invention.

Accordingly, the architecture shown in FIG. 4 may be used to implement the various components/steps shown and described above in the context of FIGS. 1-3.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

One or more embodiments can make use of software running on a general-purpose computer or workstation. In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
receiving one or more speech recognition parameters prior to issuing a verbal prompt to a user;
issuing a verbal prompt to the user;
receiving an acoustic input from the user in response to the verbal prompt;
processing one or more sequences of phonemes to obtain one or more acoustic representations, wherein the one or more sequences of phonemes are generated from a list of expected responses to the issued verbal prompt;
comparing the acoustic input from the user to the one or more acoustic representations to determine an acoustic channel characterization and/or speaker class; and
adjusting one or more speech recognition parameters based on the comparison, wherein the adjustment comprises applying feature space mapping to the acoustic input, and further wherein the one or more adjusted speech recognition parameters are used to adjust a speech recognition module of a speech recognition system to use an acoustic model that is consistent with an acoustic channel characterization and/or speaker class so that the selected acoustic model is used for decoding subsequent acoustic input provided by the user as the conversation progresses;
wherein the steps are performed by at least one processor device coupled to a memory.

2. The method of claim 1, wherein the comparing step comprises performing a channel estimation on the acoustic input.

3. The method of claim 1, wherein the comparing step comprises performing a spectral adaptation on the acoustic input.

4. The method of claim 1, wherein the comparing step comprises performing a voice print analysis on the acoustic input.

5. The method of claim 1, wherein the comparing step comprises performing a variable template matching on the acoustic input.

6. The method of claim 1, wherein the adjusting step comprises detecting a class of speaker based on the comparison results.

7. The method of claim 6, wherein the adjusting step further comprises selecting an acoustic model for the detected class of speaker.

8. The method of claim 1, further comprising selecting the issued verbal prompt from a database.

9. The method of claim 1, wherein the processing step comprises generating one or more sequences of voice frequency estimates in a given format.

10. The method of claim 9, wherein the given format is a mel frequency cepstral format.

* * * * *